(12) United States Patent
Rahman et al.

(10) Patent No.: US 12,418,577 B2
(45) Date of Patent: Sep. 16, 2025

(54) DATA DISRUPTION TRACKING FOR WIRELESS NETWORKS, SUCH AS IMS NETWORKS

(71) Applicant: T-Mobile USA, Inc., Bellevue, WA (US)

(72) Inventors: Muhammad Tawhidur Rahman, Bellevue, WA (US); Hsin Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 641 days.

(21) Appl. No.: 17/684,303

(22) Filed: Mar. 1, 2022

(65) Prior Publication Data

US 2022/0191266 A1 Jun. 16, 2022

Related U.S. Application Data

(62) Division of application No. 17/081,905, filed on Oct. 27, 2020, now Pat. No. 11,330,034.

(51) Int. Cl.
| | |
|---|---|
| *H04L 65/80* | (2022.01) |
| *H04B 7/06* | (2006.01) |
| *H04B 17/318* | (2015.01) |
| *H04L 65/10* | (2022.01) |
| *H04L 65/1016* | (2022.01) |
| *H04L 65/1069* | (2022.01) |
| *H04L 65/1104* | (2022.01) |
| *H04L 65/65* | (2022.01) |

(52) U.S. Cl.
CPC .......... *H04L 65/80* (2013.01); *H04B 7/0632* (2013.01); *H04B 17/318* (2015.01); *H04L 65/10* (2013.01); *H04L 65/1016* (2013.01); *H04L 65/1069* (2013.01); *H04L 65/1104* (2022.05); *H04L 65/65* (2022.05)

(58) Field of Classification Search
CPC . H04B 17/318; H04B 7/0632; H04L 65/1104; H04L 65/65; H04L 65/10; H04L 65/1016; H04L 65/1069
See application file for complete search history.

(56) References Cited

U.S. PATENT DOCUMENTS

| | | | |
|---|---|---|---|
| 6,836,797 B2 | 12/2004 | Givoly et al. | |
| 6,957,255 B1 | 10/2005 | Schweitzer et al. | |
| 7,020,130 B2 | 3/2006 | Krause et al. | |
| 7,366,136 B1 | 4/2008 | Kalbag et al. | |
| 7,609,646 B1 * | 10/2009 | Qi | H04L 12/66 |
| | | | 370/252 |
| 7,751,316 B2 | 7/2010 | Yarlagadda et al. | |
| 7,773,584 B2 | 8/2010 | Gorti et al. | |
| 8,077,675 B2 | 12/2011 | Stephenson et al. | |
| 8,139,604 B2 | 3/2012 | Yeom | |
| 8,750,839 B1 * | 6/2014 | Paczkowski | H04L 65/1016 |
| | | | 455/414.3 |
| 9,178,778 B2 | 11/2015 | Meloche et al. | |
| 10,440,179 B2 * | 10/2019 | Thomson | H04M 3/5175 |

(Continued)

*Primary Examiner* — Syed Ali
(74) *Attorney, Agent, or Firm* — Perkins Coie LLP (57) ABSTRACT

Systems and methods for tracking and logging mute events that occur during communication sessions are disclosed. The method includes generating a disruption report that includes one or more aspects of a mute event detected during a communication session. The disruption report is communicated to a network for further analysis.

17 Claims, 4 Drawing Sheets

(56) References Cited

U.S. PATENT DOCUMENTS

| | | | |
|---|---|---|---|
| 10,972,516 B1* | 4/2021 | Venkataraghavan | ......................... H04L 65/1083 |
| 2004/0204020 A1 | 10/2004 | Kuramitsu | |
| 2004/0213150 A1 | 10/2004 | Krause et al. | |
| 2005/0175032 A1 | 8/2005 | Yeom | |
| 2005/0233777 A1* | 10/2005 | Twerdahl | .......... H04M 1/72451 455/567 |
| 2005/0255811 A1 | 11/2005 | Allen et al. | |
| 2006/0193460 A1* | 8/2006 | Cadiz | ...................... H04M 3/54 379/211.02 |
| 2006/0256721 A1 | 11/2006 | Yarlagadda et al. | |
| 2007/0143858 A1 | 6/2007 | Hearty | |
| 2007/0270104 A1 | 11/2007 | Allen et al. | |
| 2007/0286160 A1 | 12/2007 | Gorti et al. | |
| 2008/0137529 A1 | 6/2008 | Sheikh et al. | |
| 2008/0146290 A1* | 6/2008 | Sreeram | .............. H04M 1/6066 455/575.2 |
| 2009/0073959 A1* | 3/2009 | Xu | ......................... H04L 65/765 370/352 |
| 2009/0135731 A1 | 5/2009 | Secades et al. | |
| 2009/0225670 A1 | 9/2009 | Leung et al. | |
| 2009/0316870 A1 | 12/2009 | Wise et al. | |
| 2010/0014509 A1 | 1/2010 | Kouchri | |
| 2010/0115111 A1 | 5/2010 | Varga et al. | |
| 2010/0226339 A1 | 9/2010 | Stephenson et al. | |
| 2010/0255831 A1 | 10/2010 | Shuman et al. | |
| 2011/0075653 A1 | 3/2011 | Potts et al. | |
| 2011/0110363 A1 | 5/2011 | Anandani | |
| 2011/0167172 A1 | 7/2011 | Roach et al. | |
| 2012/0081501 A1 | 4/2012 | Benzaia et al. | |
| 2012/0195242 A1* | 8/2012 | Pyles | ................. H04W 52/0251 370/329 |
| 2012/0224678 A1* | 9/2012 | Walters | ............... H04M 3/2281 379/189 |
| 2012/0294159 A1* | 11/2012 | Sridhar | ................... H04L 43/55 370/252 |
| 2013/0250779 A1 | 9/2013 | Meloche et al. | |
| 2015/0215346 A1* | 7/2015 | Kotecha | ................ H04L 67/141 709/227 |
| 2015/0270936 A1* | 9/2015 | Han | ...................... H04L 5/0035 370/329 |
| 2016/0150455 A1* | 5/2016 | Suryavanshi | ......... H04W 76/45 455/436 |
| 2016/0205518 A1* | 7/2016 | Patel | ................... G06F 9/45558 455/518 |
| 2017/0078922 A1* | 3/2017 | Raleigh | ................ H04L 69/18 |
| 2017/0085711 A1* | 3/2017 | Thomson | ............ H04M 3/5175 |
| 2017/0230908 A1* | 8/2017 | Agarwal | ................. H04W 4/80 |
| 2017/0251031 A1* | 8/2017 | Lehesaari | ............... H04L 65/80 |
| 2017/0353598 A1* | 12/2017 | Cho | .................... H04M 3/2236 |
| 2018/0124238 A1 | 5/2018 | Shah et al. | |
| 2018/0293978 A1* | 10/2018 | Sinha | .................... G06F 40/232 |
| 2018/0317196 A1* | 11/2018 | Do | ........................ H04W 24/08 |
| 2019/0149442 A1* | 5/2019 | Kelley, Jr. | ............... H04L 43/04 709/224 |
| 2019/0149445 A1* | 5/2019 | Kelley, Jr. | ............. H04L 43/026 709/224 |
| 2019/0200175 A1 | 6/2019 | Ylönen et al. | |
| 2019/0239032 A1* | 8/2019 | Balasubramanian | ........................ H04L 65/611 |
| 2019/0278865 A1* | 9/2019 | Hurwitz | ................ G06F 16/358 |
| 2019/0289047 A1 | 9/2019 | Bai et al. | |
| 2020/0195536 A1* | 6/2020 | Beattie, Jr. | ........... H04B 17/318 |
| 2020/0296554 A1 | 9/2020 | Chiang et al. | |
| 2021/0021494 A1* | 1/2021 | Yao | ....................... H04L 41/0631 |
| 2023/0289127 A1* | 9/2023 | Gupta | ................. G06F 3/04817 |

\* cited by examiner

DATA DISRUPTION TRACKING FOR WIRELESS NETWORKS, SUCH AS IMS NETWORKS

CROSS-REFERENCE TO RELATED APPLICATIONS

This application is a division of U.S. patent application Ser. No. 17/081,905, filed on Oct. 27, 2020, entitled DATA DISRUPTION TRACKING FOR WIRELESS NETWORKS, SUCH AS IMS NETWORKS, which is hereby incorporated by reference in its entirety.

BACKGROUND

Rapid growth in computing technology is creating greater demand for data communication. As an example, some mobile devices and applications allow users to watch streaming content in ultra-high definition. Also, increasing number of new devices (e.g., Internet of Things (IoT) devices, and/or wearable devices) or devices that previously provided limited functionalities (e.g., appliances) are now communicating data. However, the amount of available network resources may be limited in supporting the growing demand.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Some traditional mobile devices include internal mechanisms that detect network-related mutes, e.g., when voice-related signals are lost or dropped due to an error, during voice communications. When a duration of a mute event reaches a predetermined threshold, traditional mobile devices automatically terminate the session without user input to end the session (e.g., hanging up or terminating the call). Generally, these devices send Session Initiation Protocol (SIP) BYE messages to the core network to signal terminations. For such mute-based automatic terminations, the mobile device can use special headers to notify the core network of the mute event. However, users often terminate the session (e.g., hang up the call) in response to the mute event before the predetermined duration threshold. Accordingly, the mobile devices do not send the mute-related information, and the core network fails to obtain any information regarding the mute event and thus does not know if, e.g., the user terminated the call because of a poor-quality connection.

In contrast, implementations of the present technology seek to provide quality reports for mute events, even for events that do not persist until the threshold duration and/or even when the user terminates the session. In some implementations, mobile devices are configured to determine the mute-related information (via, e.g., the existing internal mechanisms) that represent network-related mutes (e.g., absence of Real-time Transfer Protocol (RTP) packets) during voice communications. The mobile devices track the mute-related information (via, e.g., an Internet Protocol (IP) Media Subsystem (IMS) protocol stack) and report the tracked information to the mobile communication network. For example, the mobile devices can be reconfigured such that the RTP packet loss is periodically reported to the IMS stack. The IMS stack in the mobile device can track the RTP loss information (e.g., duration, loss rate, direction, channel conditions, etc.) during the session. When the session ends, regardless of the source of termination, the IMS stack can include the tracked information in the SIP BYE message according to a predetermined process. Also, the mobile devices can also be configured to determine and report a duration, a direction, a packet drop rate, a radio connection indicator, and/or a geographic location associated with, or at the time of, the mute event.

The network receives the quality information from the mobile devices, such as through the SIP BYE messages. Accordingly, the core network obtains the crowd-sourced information related to the mute events. In some implementations, the core network uses the crowd-sourced information to identify patterns and/or causes for the mute events. For example, the core-network can generate a histogram and/or implement a pattern recognition algorithm to identify certain conditions, scenarios, locations, and/or device combinations associated with the mute events.

Using the reported information, the network can obtain more accurate information of mute events, thereby identifying and fixing potential root-causes for the mutes (e.g., erroneous conditions). Accordingly, by communicating the quality information for mute events, the network can improve network performances and reduce mute events.

Various examples of the invention will now be described. The following description provides certain specific details for a thorough understanding and enabling description of these examples. One skilled in the relevant technology will understand, however, that the invention can be practiced without many of these details. Likewise, one skilled in the relevant technology will also understand that the invention can include many other obvious features not described in detail herein. Additionally, some well-known structures or functions may not be shown or described in detail below, to avoid unnecessarily obscuring the relevant descriptions of the various examples. Further, the examples in this application of prior or related systems and their associated limitations are intended to be illustrative and not exclusive. Other limitations of existing or prior systems will become apparent to persons of ordinary skill in the art upon reading the following description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like, generally mean the particular feature, structure, or characteristic following the phrase is included in at least one implementation of the present technology and can be included in more than one implementation. In addition, such phrases do not necessarily refer to the same implementations or different implementations.

Suitable Environment

Figure 1:
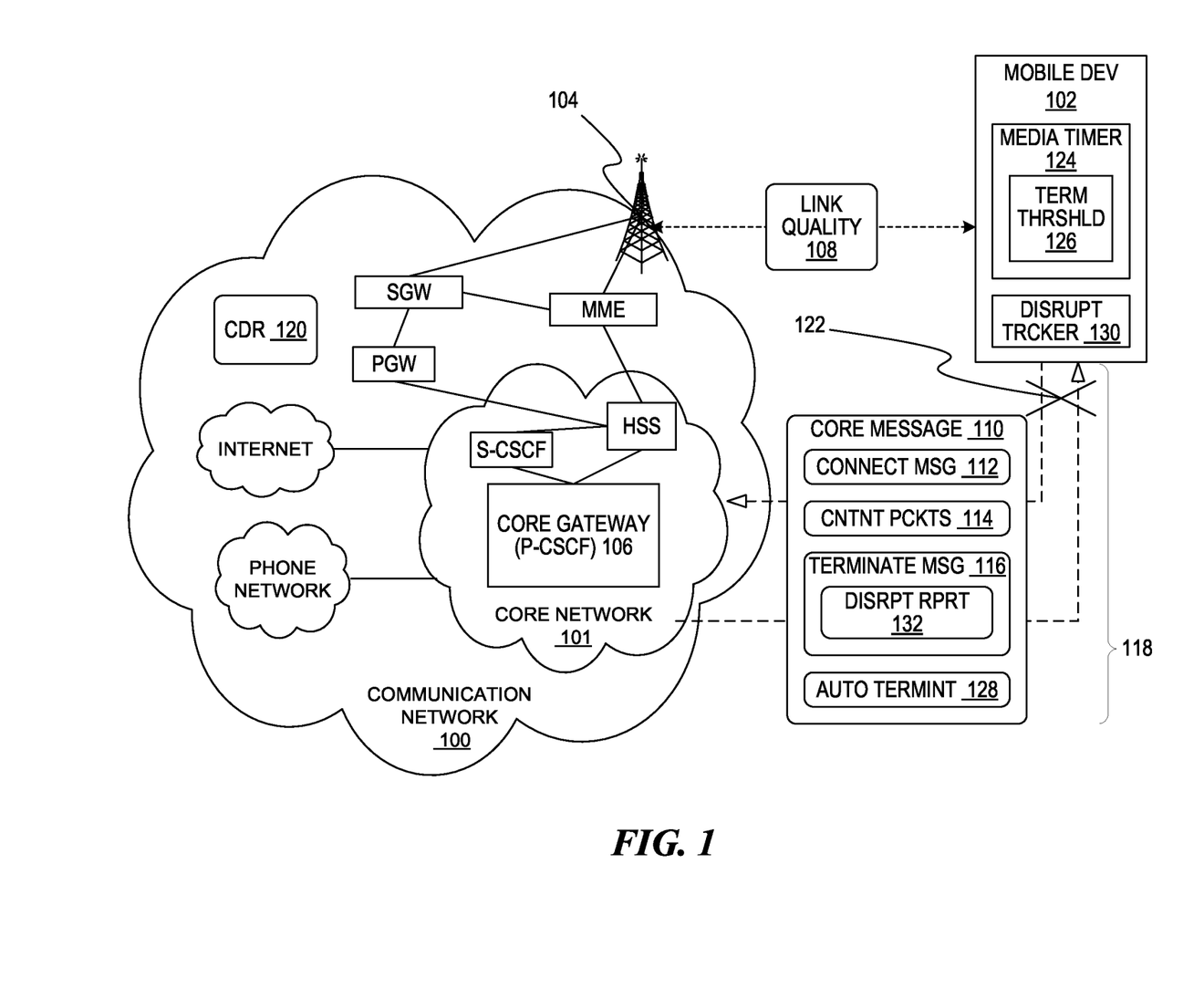
FIG. 1 illustrates a communication network in which some implementations of the present technology can be utilized.

FIG. 1 illustrates a communication network 100 (also referred to herein as network 100) in accordance with various implementations or embodiments. The communication network 100 can communicatively couple devices, including a mobile device 102 (e.g., User Equipment (UE)). The mobile device 102 can include wireless and/or mobile end-user devices. Some examples of the mobile device 102 can include a mobile phone (e.g., a smart phone), a laptop, a wearable device (e.g., a smart watch, augmented-reality (AR) glasses, etc.), an IoT device, a smart vehicle, an autonomous vehicle, and the like.

The network 100 can include access nodes 104 configured to serve as hubs that function as gateways for the network 100. Some examples of the access node 104 can include a Radio Access Network (RAN) Node (e.g., an Evolved-Universal Terrestrial Radio Access Network (E-UTRAN) Node B (eNode B or eNB), a Radio Network Controller (RNC) in an E-UTRAN, and/or a next generation Node B (gNB)). The access node 104 may also include a base station, a Wireless Fidelity (WiFi) router, a modem, and/or other network gateway devices. The access nodes 104 can be configured to communicate with the mobile devices 102 according to one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communication technologies.

In general, the network 100 can include multiple cells, with each cell including one or more BSs (macro cell), 5G transceivers (including small cell devices), or a combination of both macro and small cells (HetNets), though many other cell types are possible, including cells having one or more femtocells, picocells, IEEE 802.11 access points (WiFi APs), and the like. Depending on the configuration and size, the network 100 can represent and serve various regional areas, for example, one or more rooms, one or more blocks, a city, a state, an entire nation, the whole world, etc. The network 100 may be operated by a service/network provider. End users may sign up as subscribers of the provider and one or more networks thereof.

The network 100 can include network nodes communicatively coupled to the access nodes 104. The network nodes can be configured to process and/or route information to/from the mobile devices 102 to counterpart communication endpoints (e.g., service providers, content/service servers, and/or other end-user devices). The access nodes 104 can be communicatively coupled (e.g., using a backhaul connection) to backhaul equipment, for example, an operation support subsystem (OSS) server, a radio network controller (RNC), etc. Some examples of the network nodes can include a mobility management entity (MME), a serving gateway (SGW), and/or a package data network (PDN) gateway (PGW). The MME can be a control node for an access network. The MME can control an idle mode UE paging and tagging. The MME can select the serving gateway SGW for the mobile device 102. The SGW can be a component configured to route and forward user data packets to/from the UEs (e.g., via the access node 104). The SGW can function as a reference for a user plane during handovers for connecting a UE to a different connection node. The PGW can include network components configured to provide connectivity between the UEs and external packet data networks. In other words, the PGW can function as an exit/entry point of traffic for the UEs. Additionally or alternatively, the network nodes can include Network Functions (NFs).

The network 100 can include a core network 101 configured to function as a backbone portion of the network 100. For example, the core network 101 can include components (e.g., a set of the network nodes) configured to implement wireless communications, such as cellular communication networks and/or wireless fidelity networks. The core network 101 can be connected to different parts of the network 100, such as the Internet and/or telephone networks. Accordingly, the core network 101 can establish/facilitate communication sessions 118 for exchanging data between communication endpoints (e.g., end-user devices and/or service provider servers). The core network 101 can include an IP Multimedia Core Network Subsystem (IMS).

As an illustrative example, the core network 101 can include one or more core gateway nodes 106 (e.g., Proxy-Call Session Control Functions (P-CSCF)). The gateway nodes 106 can each include hardware (e.g., circuitry), software, and/or firmware configured to function as a Session Initiation Protocol (SIP) proxy. The gateway nodes 106 can each include a Session Border Controller (SBC). The gateway node 106 can serve as a first point of contact for the core network 101. Accordingly, the gateway node 106 can be configured to facilitate registration of the mobile device 102 for the core network 101, such as for providing/allowing access to the core network 101. Also, the gateway node 106 can facilitate termination of the communication session 118, such as for hanging up voice calls.

The core network 101 can function at a layer above the radio access protocol used to link the mobile device 102 to the access node 104. For example, the mobile device 102 to the access node 104 can communicate link quality measures 108 that describe a characteristic or a condition of the wireless communication, such as for signal transmission, reception, detection, decoding, etc. As examples, the link quality measure 108 can include a Channel Quality Indicator (CQI), a Channel State Information (CSI), a Received Signal Strength Indication (RSSI), a Reference Signal Received Power (RSRP), a Reference Signal Received Quality, and the like. The link quality measures 108 can be processed by the access node 104 to improve the wireless link between the access node 104 and the mobile device 102, normally without providing the link quality measures 108 to the core network 101. However, in some implementations of the present technology, the core network 101 can obtain the link quality measures 108 associated with certain targeted conditions, such as when the mobile device 102 detects mute events (e.g., absence of RTP packets).

Using the wireless link, the mobile device 102 and the network 100 (e.g., the core network 101) can exchange core messages 110. In other words, the payload communicated over the wireless link and through the access node 104 can include the core message 110 processed by the core network 101. In some implementations, the core messages 110 can be formatted according to the SIP. For example, the core messages 110 can include a connection message 112 configured to request connection by the mobile device 102 to the core network 101. The connection message 112 can correspond to an authentication request from the mobile device 102 for accessing the core network 101. The connection message 112 can essentially establish the communication session 118. With the communication session 118 established, the mobile device 102 and the core network 101 can exchange targeted/requested content, such as audio and/or visual data (e.g., web pages, images, texts, sound signals, streaming content, search results, etc.) using content packets 114. In some implementations, the content packets 114 in the core messages 110 can include RTP packets. For voice communications (e.g., via Voice over Internet Protocol (VoIP), Voice over LTE (VoLTE) and/or Voice over IMS), the RTP packets can carry the audio signals used to recreate the sounds/voice on the receiving device. To end the communication session 118, the core message 110 can include a termination-based message 116. For example, the termination-based message 116 can include a SIP BYE message used to end a voice communication.

The communication sessions 118 can experience unintended content disruptions 122. For voice communications, the content disruptions 122 can correspond to mute events when the content packets 114 are absent. For example, the content disruptions 122 can correspond to absence of the RTP packets. The content disruptions 122 can be separate or different from silences; the RTP packets can represent background noise or inserted values that correspond to silences. The content disruptions 122 can be caused by one or more errors or failures at the access node 104 (e.g., degradation in the wireless link) and/or at one or more network nodes.

The mobile devices 102 can be configured to detect the content disruptions 122. For example, the mobile device 102 can include an internal mechanism configured to detect absences in the RTP packets during voice calls. The mobile device 102 can include a media timer 124 configured to track a duration of the content disruption 122. For example, the mobile device 102 can count/increment clock pulses while the RTP packets are not present in the core messages 110. The mobile device 102 can be configured to autonomously initiate termination of the communication session 118 when the tracked duration of the content disruption 122 satisfies an autonomous termination threshold 126 (e.g., a predetermined duration, such as 5 seconds or greater). When the tracked duration of the mute event reaches the autonomous termination threshold 126, the mobile device 102 can autonomously/automatically terminate the communication session 118 (e.g., send the termination-based message 116, such as the SIP BYE message) without user input for the termination. The mobile device 102 can indicate the autonomous termination in the termination-based message 116. For example, the mobile device 102 can generate and send an autonomous termination message 128 (e.g., a specific type of the termination-based message 116) to terminate the communication session and to indicate the autonomous termination event and the corresponding mute event. In some implementations, the autonomous termination message 128 can be an instance of the termination-based message 116 with predetermined values/text in a header thereof.

The mobile device 102 can further include a disruption tracker 130 configured to track the content disruption 122 (e.g., the mute event) and/or determine associated information. For example, the disruption tracker 130 can include a circuit, a software module/routine, and the like configured to store the tracked duration(s) from the media timer 124 even when the duration(s) do not satisfy the autonomous termination threshold 126. In some implementations, the disruption tracker 130 can have a stack/layer (e.g., an RTP stack) that tracks or processes the RTP periodically to provide information related to the mute event (e.g., the tracked value of the media timer 124) to a reporting or a messaging stack/layer (e.g., an IMS stack). Also, the disruption tracker 130 can be configured to determine other related aspects of the content disruption 122, such as by calculating/measuring a packet loss rate, a direction of the mute (e.g., whether the packets are absent in an uplink direction and/or a downlink direction), and the like. In some implementations, the disruption tracker 130 can be configured to obtain the link quality measures 108 at the time of the content disruption 122.

The mobile device 102 (via, e.g., the disruption tracker 130 and/or the messaging stack/layer) can be configured to generate and send a disruption report 132 to the core network 101. The mobile device 102 can generate and send the disruption report 132 when the content disruption 122 is detected during the communication session 118 and/or when the communication session 118 ends, such as according to the corresponding user input. The disruption report 132 can include the information determined by the disruption tracker 130, such as an indication that the content disruption 122 occurred. The disruption report 132 can further include information associated with the content disruption 122, such as a duration, a packet loss rate, a communication direction, the link quality measure 108, or a combination thereof. In some implementations, the disruption report 132 can be included in the termination-based message 116 (e.g., the SIP BYE message). For example, the disruption report 132 can be included as numbers, symbols, letters, and/or other characters included in a header portion of the disruption report 132. Additionally or alternatively, the disruption report 132 can be included in a payload portion thereof and/or a dedicated bit slot thereof.

The network 100 (via, e.g., the core network 101) can track and record details of the communications in a Call Detail Record (CDR) 120. For example, the CDR 120 can include details for voice communications (e.g., telephone calls), such as originating party identifier (e.g., phone number), corresponding party identifier (e.g., call recipient phone number), starting/end time of the session, session duration, utilized nodes, routing path, etc. The CDR 120 may not include any information associated with the content disruption 122.

Architecture

Figure 2:
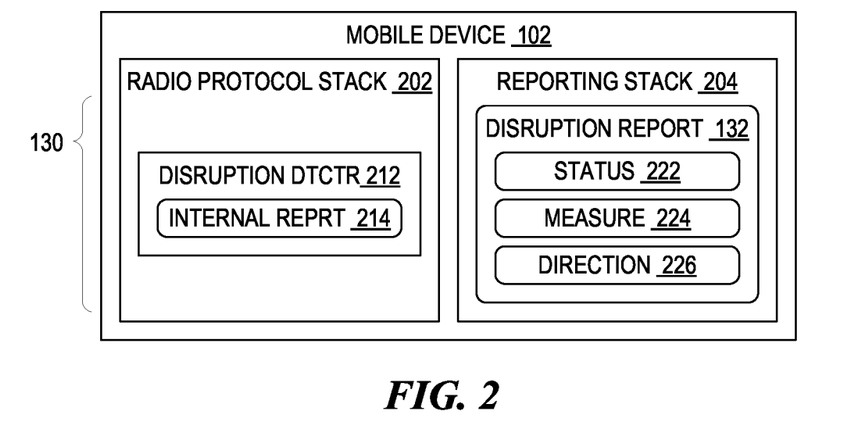
FIG. 2 illustrates a block diagram of an example mobile device in accordance with one or more implementations of the present technology.

FIG. 2 illustrates a block diagram of an example mobile device (e.g., the mobile device 102) in accordance with one or more implementations of the present technology. The mobile device 102 can include circuitry and/or software configured to implement a radio protocol stack 202. The radio protocol stack 202 can be configured to receive and process the core message 110 of FIG. 1, such as the content packets 114 of FIG. 1. In some implementations, the radio protocol stack 202 can include the RTP layer configured to process the RTP packets.

The radio protocol stack 202 can include a disruption detector 212 (e.g., an internal circuit and/or software mechanism) configured to determine disruptions (e.g., absences) in the content packets 114. For example, the disruption detector 212 can be configured to determine absences of the RTP packets during the communication session 118 of FIG. 1. The disruption detector 212 can be associated or integral with the media timer 124 of FIG. 1, the disruption tracker 130 of FIG. 1, or a combination thereof. For example, the disruption detector 212 can report the absence of the RTP packet(s) to the media timer 124 via an internal content report 214, and the media timer 124 can track the duration of the corresponding mute event using the internal content report 214. When the duration of the mute event satisfies the autonomous termination threshold 126, the mobile device 102 can autonomously (e.g., without corresponding user input) terminate the communication session as described above.

The mobile device 102 can further include circuitry and/or software configured to implement a reporting stack 204. The reporting stack 204 can be configured to provide and/or format content reported or sent to the communication network 100 of FIG. 1. For example, the reporting stack 204 can include the IMS stack or the SIP stack configured to generate and/or format the core messages 110 of FIG. 1 to the core network 101 of FIG. 1. Accordingly, the reporting stack 204 can be configured to generate and communicate termination-based message 116 of FIG. 1, the disruption report 132, or a combination thereof.

As an illustrative example, the radio protocol stack 202 and/or the disruption detector 212 can be configured to provide the internal content report 214 to the reporting stack 204 according to a predetermined interval or frequency (e.g., once per a predetermined number of seconds/minute). The reporting stack 204 can identify a beginning of a mute event when the RTP packet is first reported as being absent during a session (e.g., subsequent to having received one or more RTP packets). The reporting stack 204 can track a duration of the mute event based on counting a number of subsequent sequential set of reports showing the absence of the RTP packets. The reporting stack 204 can determine other related aspects of the content disruption 122, such as a status 222, a measure 224, and/or a direction 226 associated with the mute event. For example, the reporting stack 204 can determine the status 222 to represent an ongoing or a detected mute event based on the absence of the RTP packet(s). Also, the reporting stack 204 can calculate the measure 224 as the duration and/or the packet loss rate. The packet loss rate can be calculated based on a number of mute events, lengths of the mute events, durations between the mute events, or a combination thereof, for the communication session. Further, the reporting stack 204 can interact with the disruption tracker 130 to determine the direction 226 of the mute (e.g., whether the packets are absent in an uplink direction and/or a downlink direction). Additionally or alternative, the reporting stack 204 can interact with the disruption tracker 130 to obtain the link quality measures 108 at the time of the content disruption 122. The reporting stack 204 can aggregate and track information regarding the mute events for each communication session.

When the status 222 and/or other tracked information for the communication session indicates the existence of at least one mute event, the reporting stack 204 can provide the disruption report 132 that includes information regarding the mute event(s). The reporting stack 204 can provide the disruption report 132 regardless of whether the communication session is terminated autonomously by the mobile device 102 or according to a termination input provided by the user. The reporting stack 204 can include the disruption report 132 having the status 222, the measure 224, the direction 226, and/or other descriptions regarding the mute event(s) occurring during a communication session in the termination-based message (e.g., the SIP BYE message) for the corresponding session.

Reporting Format

Figure 3:
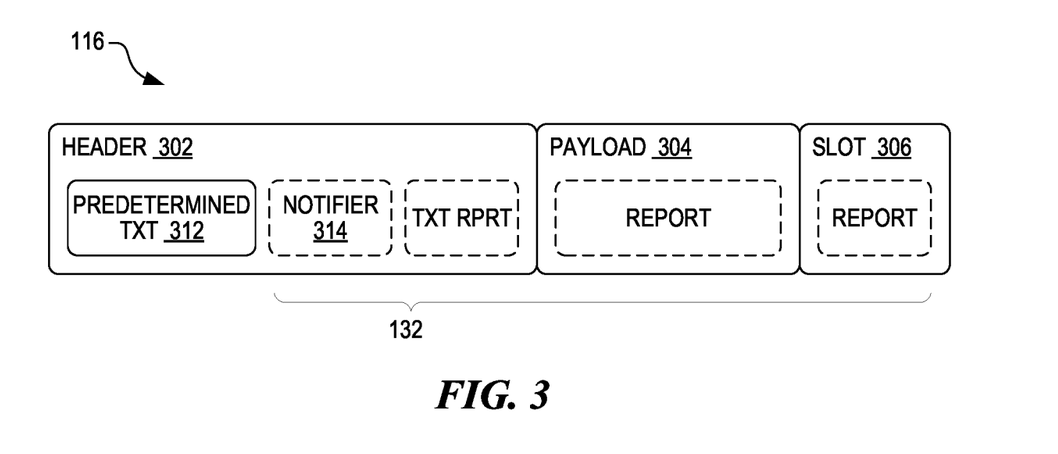
FIG. 3 illustrates a block diagram of an example message in accordance with one or more implementations of the present technology.

FIG. 3 illustrates a block diagram of an example message (e.g., the core message 110 of FIG. 1, such as the termination-based message 116) in accordance with one or more implementations of the present technology. The example message can include the disruption report 132 in one or more locations therein according to a corresponding format.

The core message 110 can include a header 302, a payload 304, and/or one or more slots 306 (e.g., bit locations) designated according to a predetermined format/standard. The header 302 can identify a type, a title, an identifier, and/or other general descriptions for the core message 110. For example, the header 302 can include a predetermined text 312 that provides the type, the title, etc., describing the core message 110. As an illustrative example, the predetermined text 312 can specify that the core message 110 is the termination-based message 116 and/or an indication that the corresponding session was terminated by the user. The payload 304 can include content information targeted for communication by the core message 110. The slots 306 can be used to communicate information and/or values corresponding to the designated type or category of information.

The disruption report 132 can be included in the header 302, the payload 304, and/or the designated slots 306. For example, the reporting stack 204 can include the mute-related information as a notifier 314 and/or a text report in the header 302. The notifier 314 can include a predetermined set of characters that indicates the presence of the disruption report 132 within the termination-based message 116. The corresponding text report can describe the status 222, the measure 224, the direction 226, and/or other descriptions regarding the mute event(s). The core network 101 of FIG. 1 can search for the notifier 314 within the header 302 (e.g., with or without standardization) to identify the presence of the disruption report 132. Upon detecting the notifier, the core network 101 can obtain and analyze the remaining text report to receive and determine the disruption report 132 or a portion thereof. Also, the reporting stack 204 can include the disruption report 132 in the payload 304 and/or corresponding predetermined slots 306 according to a predetermined content/format (e.g., according to standardized formats).

Control Flow

Figure 4:
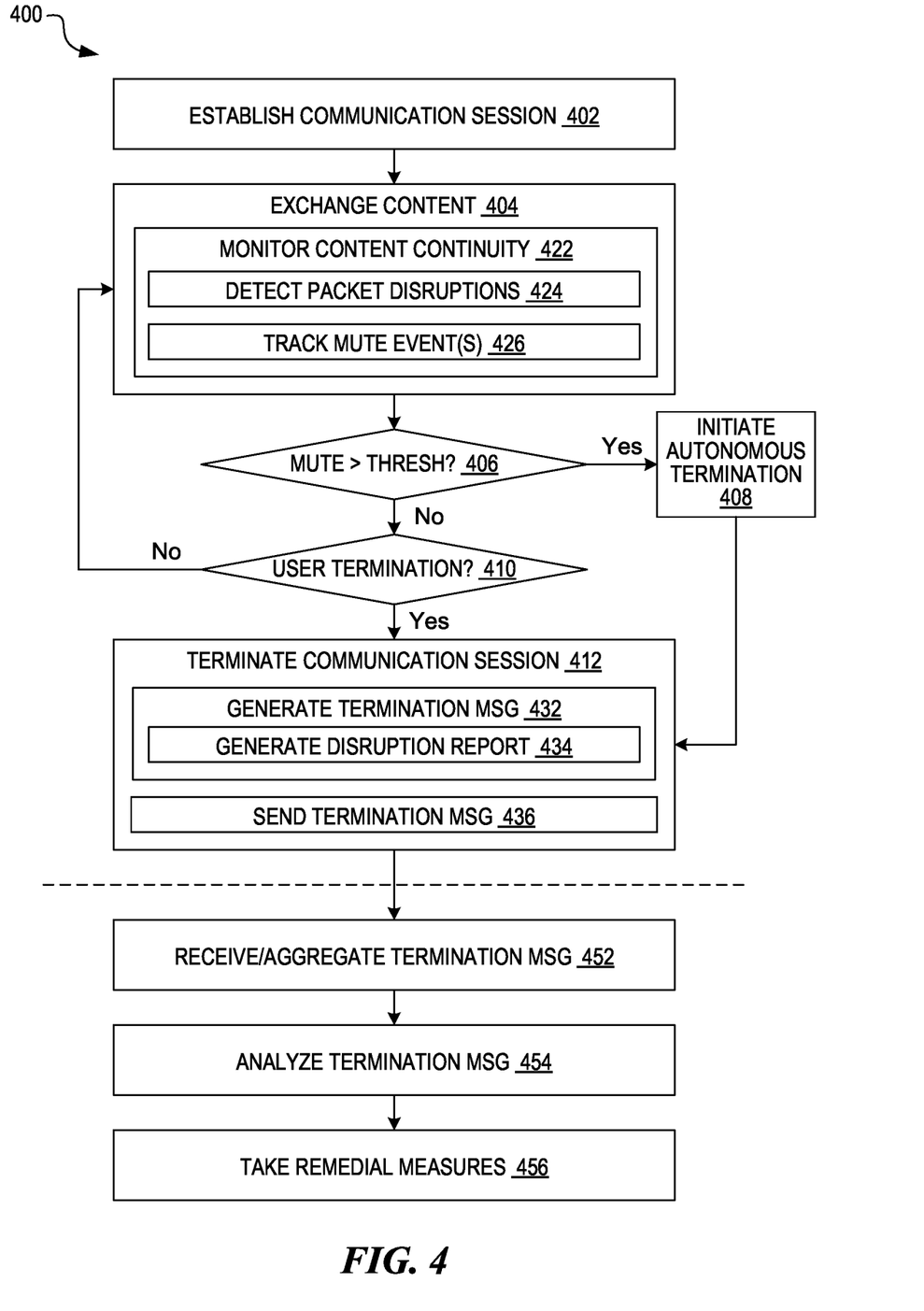
FIG. 4 is a flow diagram illustrating an example method for tracking disruptions in accordance with one or more implementations of the present technology.

FIG. 4 is a flow diagram illustrating an example method 400 for tracking disruptions in accordance with one or more implementations of the present technology. The method 400 can be implemented using the communication network 100 of FIG. 1, the core network 101 of FIG. 1, and/or the mobile device 102 of FIG. 1.

At block 402, the mobile device 102 establishes a communication session based on interacting with the communication network 100. For example, the mobile device 102 (e.g., the IMS layer) and the communication network 100 can interact with each other and execute a connection sequence for establishing a wireless radio link. Accordingly, the mobile device 102 can establish a wireless radio link with a radio access node 104 of FIG. 1 of the communication network 100. Once the radio link is established, the mobile device 102 can interact with the core network 101 of FIG. 1 and execute an authentication sequence that includes sending one or more authenticated registration requests. The mobile device 102 can access the core network 101 based on the authenticated registration request.

Once the mobile device 102 is authenticated and registered for the core network 101, the mobile device 102 can establish a communication session for exchanging data (e.g., sound data corresponding to voice communications) with one or more end point devices. The communication session can be facilitated by the core network 101. To establish the communication session, the mobile device 102 and the core network 101 can exchange requests and responses associated with SIP INVITE. Accordingly, the mobile device 102 and the core network 101 can implement a voice-communication session for communicating voice data to a counterpart device over the wireless radio link and through the core network 101.

At block 404, the mobile device 102 and the communication network 100 exchange content during the communication session. For example, the mobile device 102, the core network 101, and the counterpart device can communicate voice data (via, e.g., RTP packets) for the voice-communication session. The radio protocol stack 202 of FIG. 2 can implement the content communication.

At block 422, the mobile device 102 monitors content continuity while exchanging content. For example, as illustrated at block 424, the radio protocol stack 202 and/or the disruption tracker 130 of FIG. 1 detects packet disruptions. The radio protocol stack 202 can detect any disruptions/discontinuities in the RTP packets.

At block 426, the mobile device 102 tracks mute events based on the detected packet disruptions. For example, the radio protocol stack 202 can provide to the reporting stack 204 of FIG. 2 a status (e.g., the internal content report 214 of FIG. 2) with information regarding the disruptions/discontinuities in the RTP packets. The reporting stack 204 can detect mute events based on the internal content report 214 during the voice-communication session. The reporting stack 204 can detect mute events in response to an initial detection of the RTP discontinuity. The reporting stack 204 can further derive/analyze information regarding the mute events, such as a duration of the mute event, a packet drop rate during the voice-communication session, a mute direction (e.g., uplink/downlink), a radio condition indicator, etc., as described above.

As an illustrative example, the reporting stack 204 can receive the internal content report 214 according to a predetermined frequency. Accordingly, the reporting stack 204 can derive the disruption measure 224 of FIG. 2 based on calculating the mute duration using a number of sequentially (e.g., back to back) reported absences in the RTP packets and the corresponding durations/periods associated with the reporting frequency. Also, the reporting stack 204 can calculate the packet drop rate based on a total number of reported absences in the RTP packets in comparison to a total number of communicated packets and/or a total duration for the session. The reporting stack 204 can determine the mute direction based on details of the RTP packet detection included in the internal content report 214. The reporting stack 204 can further determine the radio condition indicator representative of one or more conditions associated with a wireless link between the wireless communications device and the communication network during the voice-communication session. The reporting stack 204 can use the packet drop rate as the radio condition or quality indicator. Alternatively or additionally, the reporting stack 204 can interact with the baseband modem or a corresponding layer mechanism to access the link quality measures 108 of FIG. 1 (e.g., CQI, RSSI, RSRP, RSRQ, etc.) reported/obtained during the voice-communication session. The reporting stack 204 can use the link quality measures 108 to derive the radio condition indicator.

At decision block 406, the mobile device 102 determines whether the mute duration exceeds a threshold (e.g., the autonomous termination threshold 126 of FIG. 1). At block 408, the mobile device 102 initiates autonomous termination when the mute duration exceeds the threshold. In other words, the mobile device 102 can terminate the voice-communication session without any corresponding user input.

Otherwise (e.g., when the mute duration is less than the threshold) at decision block 410, the mobile device 102 determines whether the user terminated the communication session (via, e.g., a call hang up input). The mobile device 102 can continue to exchange the content without user input to terminate the voice-communication session.

At block 412, the mobile device 102 terminates the communication session. The mobile device 102 can terminate according to the autonomous termination process and/or the user input. As part of the termination process, the mobile device 102 generates a termination message (e.g., the termination-based message 116 of FIG. 1) as illustrated at block 432. For example, the mobile device 102 can generate an SIP BYE message in terminating the communication session.

At block 434, the mobile device 102 generates a disruption report (e.g., the disruption report 132 of FIG. 1). For example, the reporting stack 204 can generate the disruption report 132 (e.g., the mute report) based on the detected mute event(s) for providing information regarding the mute event(s) to a network component (e.g., the IMS component) in the communication network 100. The reporting stack 204 can generate the disruption report 132, including various aspects of the mute event(s), such as the indication, the duration, the direction, the rate, etc., of the mute event(s). Also, the reporting stack 204 can include the radio condition indicator for the mute event(s) in the disruption report 132, as well as other useful data (if available), such as location, timestamp, radio type, wireless protocol, and/or mobile/base station ID.

The reporting stack 204 can generate the disruption report 132 according to a predetermined format and/or standard. For example, the reporting stack 204 can generate the SIP BYE message with the disruption report 132 included in the payload 304 of FIG. 3 and/or the designated slot 306 of FIG. 3 for the disruption report 132. Alternatively or additionally, the reporting stack 204 can generate the SIP BYE message with the disruption report 132 included in the header 302 of FIG. 3. The reporting stack 204 can include the notifier 314 of FIG. 3 to indicate the presence of the disruption report 132, such as for a user-prompted termination. The reporting stack 204 can include the disruption report 132 using predetermined characters and/or sequences thereof (e.g., a text string) in the header 302 after the notifier 314. The disruption report 132 can be separate from a CDR associated with the call and separate from the link quality measures 108 associated with the wireless connection management.

At block 436, the mobile device 102 sends the termination message (e.g., the termination-based message 116, such as the SIP BYE) to the core network 101. The mobile device 102 can send the termination message and the disruption report 132 therein via the reporting stack 204 to the communication network 100. Accordingly, the mobile device 102 can notify the communication network 100 of the mute event(s) when the voice-communication session is terminated in response to the user input and before satisfying the autonomous termination threshold 126 predetermined for the mobile device 102.

At block 452, the communication network 100 receives/aggregates the termination message (e.g., the termination-based message 116, such as the SIP BYE) from multiple mobile devices. Accordingly, the communication network 100 can obtain and aggregate the disruption reports 132 representative of mute events across multiple mobile devices and/or multiple voice-communication sessions.

At block 454, the communication network 100 analyzes the termination messages from the multiple devices. In other words, the communication network 100 can analyze the crowd-sourced data regarding the mute events across the multiple mobile devices and/or the multiple voice-communication sessions. For example, the communication network 100 can extract the disruption reports 132 and/or components thereof from the termination-based messages 116 based on a predetermined format that designates values and/or bit locations within the session-end message for the mute report. The communication network 100 can analyze the extracted disruption reports 132 and/or components thereof to determine estimated causes, such as patterns associated with a design (as represented by, e.g., a manufacture brand/model) of the mobile device, a type of the mobile device (e.g., a smart phone, a wearable device, an IoT device, etc.), a geographical location, a network condition, or a combination thereof, associated with the set of obtained mute reports. The communication network 100 can utilize a machine learning mechanism, a pattern-recognition mechanism, and/or other artificial-intelligence mechanism to derive patterns, clusters, models, etc., from the mute event status, the duration, the direction, the radio condition indicator, a corresponding delimiter, a geographic location associated thereto, or a combination thereof.

At block 456, the communication network 100 recommends or takes remedial measures. For example, the communication network 100 can update, adjust, add, and/or remove network functions/components according to the detected issues or make recommendations to take such measures. Alternatively or additionally, the communication network 100 can implement the remedial measures using procedural changes and/or software adjustments.

As described above, the disruption report 132 provides information regarding the mute event(s) even when the communication session is terminated by the user. The communication network 100 can use the provided information to determine any issues and corresponding improvements as described above. Thus, the communication network 100 can obtain increased amount of mute-related data and improve the connectivity and the quality of subsequent communications. Further, the disruption report 132 can be implemented as text strings and/or the notifier 314 within the header 302, thereby allowing the communication network 100 and the mobile devices to communicate the disruption reports 132 even without standardized format/protocol.

Computer

Figure 5:
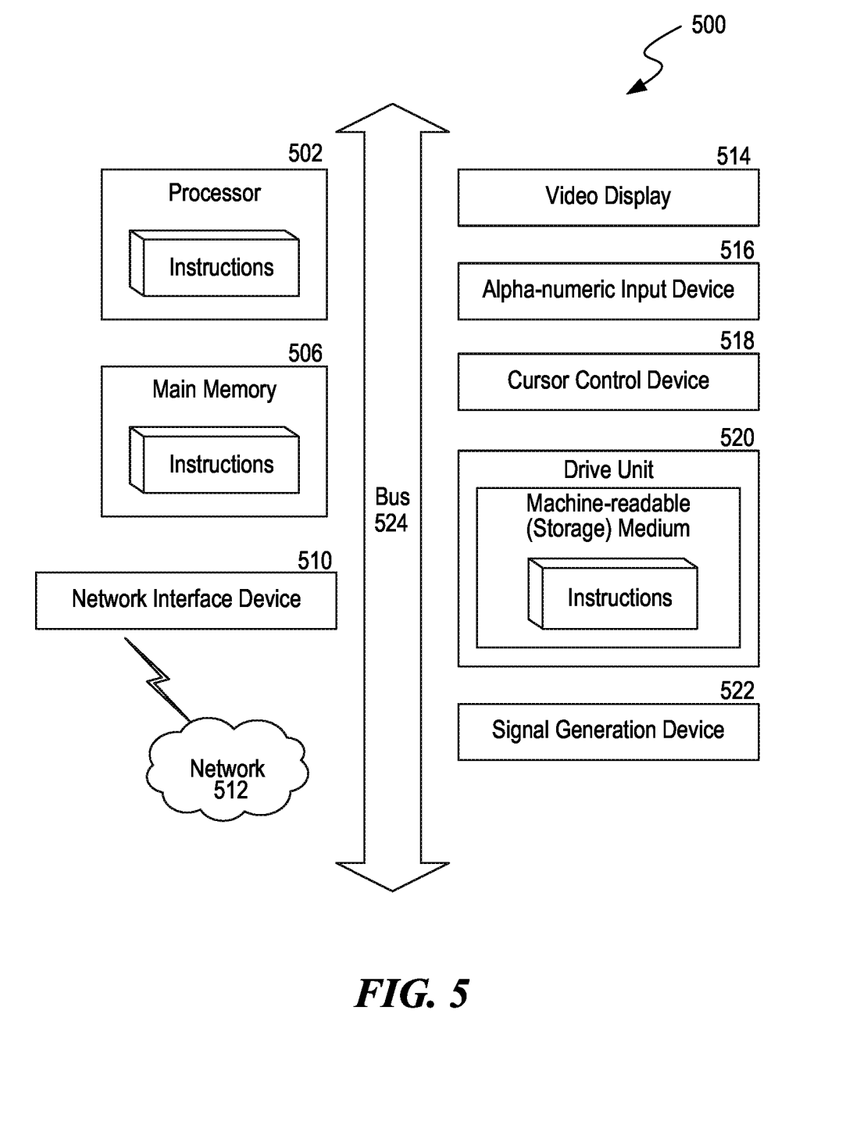
FIG. 5 is a diagrammatic representation of a machine in the example form of a computer system within which a set of instructions, for causing the machine to perform any one or more of the methodologies discussed herein, can be executed.

FIG. 5 is a diagrammatic representation of a machine in the example form of a computer system 500, within which a set of instructions for causing the machine to perform any one or more of the methodologies or modules discussed herein, can be executed.

In the example of FIG. 5, the computer system 500 includes a processor 502, a memory 506, a drive unit 520 (e.g., a machine-readable storage medium, such as a non-volatile memory), and an interface device 510. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As an example, and not by way of limitation, computer system 500 can be an embedded computer system, a system-on-chip (SOC), a single-board computer system (SBC) (such as, e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example, and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

The processor 502 can be, for example, a conventional microprocessor, such as an Intel Pentium microprocessor or Motorola power PC microprocessor. One of skill in the relevant art will recognize that the terms "machine-readable (storage) medium" or "computer-readable (storage) medium" include any type of device that is accessible by the processor 502.

The memory 506 is coupled to the processor by, for example, a bus 524. The memory 506 can include, by way of example but not limitation, random access memory (RAM), such as dynamic RAM (DRAM) and static RAM (SRAM). The memory 506 can be local, remote, or distributed.

The bus 524 also couples the processor 502 to the drive unit 520. The drive unit 520 can include a non-volatile memory that is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the drive unit 520. It should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 524 also couples the processor 502 to the network interface device 510. The network interface device 510 can include one or more of a modem or network interface. It will be appreciated that a modem or network interface can be considered to be part of the computer system 500. The network interface device 510 can include an analog modem, ISDN modem, cable modem, token ring interface, satellite transmission interface (e.g., "direct PC"), or other interfaces for coupling a computer system to other computer systems.

The system 500 can include one or more input and/or output devices, such as a video display 514 and/or an alpha-numeric input device 516. The I/O devices can include, by way of example but not limitation, a keyboard, a mouse or other pointing device, disk drives, printers, a scanner, and other input and/or output devices, including a display device. The video display 514 can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some implementations. The required structure for a variety of these systems will appear from the description below. In addition, the techniques are not described with reference to any particular programming language, and various implementations can thus be implemented using a variety of programming languages.

In alternative implementations, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed for the implementations, can be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while implementations have been described in the context of fully functioning computers and computer systems, those skilled in the art will appreciate that the various implementations are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media, such as volatile and non-volatile memory devices, floppy and other removable disks, hard disk drives, optical disks (e.g., Compact Disk Read-Only Memory (CD-ROMS), Digital Versatile Disks, (DVDs), etc.), among others, and transmission type media, such as digital and analog communication links.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like, are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A wireless communications system comprising:
    an access device configured to provide a wireless link between the wireless communications system and a mobile device; and
    an Internet Protocol (IP) Multimedia Core Network Subsystem (IMS) network coupled to the access device, the IMS network including one or more network components configured to:
        implement a voice-communication session for communicating voice data between the mobile device and at least one end-point device;
        receive a session-end message, including a mute report, wherein the session-end message is for signaling an end of the voice-communication session according to an input from a user of the mobile device;
        determine, at the mobile device, a packet drop rate using a total number of reported absences in packets during the voice-communication session and a total number of communicated packets or a total session duration;
        generate, at the mobile device, a radio condition indicator that represents one or more conditions associated with the wireless link during the voice-communication session,
            wherein the radio condition indicator includes the determined packet drop rate;
        determine a mute report based on the session-end message, wherein the mute report represents a mute event detected by the mobile device during the voice-communication session, and
            wherein the mute report includes, for the mute event, the radio condition indicator and at least two of:
                a duration of the mute event,
                a direction of the mute event,
                a geographic location associated with of the mute event, or
                a time of the mute event, and
            wherein the mute report is determined according to a predetermined format that designates values and/or bit locations within the session-end message for the mute report.

2. The wireless communications system of claim 1, further comprising a network analyzer coupled to or included in the IMS network, the network analyzer configured to:
    crowd-sourcing a set of mute reports representative of mute events across a set of corresponding voice-communication sessions,
        wherein the set of mute reports includes the determined mute report; and
    identifying an estimated cause associated with the determined mute report based on analyzing the set of mute reports,
        wherein the estimated cause represents a geographic location, the access device, a manufacturer, or a device type corresponding to the mobile device, a network condition, or a combination thereof associated with the set of mute reports.

3. The wireless communications system of claim 1, wherein the mute report represents the mute event occurring at a beginning portion of the voice-communication session and/or occurring intermittently during the voice-communication session.

4. The wireless communications system of claim 1, wherein the mute report is determined based on parsing a text header to identify one or more text strings that represent a mute event status, a duration, a direction, a radio condition indicator, a corresponding delimiter, or a combination thereof.

5. The wireless communications system of claim 1, wherein the mute report is separate from a Call Detail Record (CDR) and a link quality data configured to describe the wireless radio link to the access device.

6. An apparatus for use in a wireless communications system, the apparatus comprising:
    at least one hardware data processor, wherein the at least one hardware processor is coupled to an Internet Protocol (IP) Multimedia Core Network Subsystem (IMS) network, and
        wherein the IMS network is coupled to an access device configured to provide a wireless link with a mobile device; and
    at least one memory device coupled to the at least one hardware data processor and storing instructions, which when executed by the at least one hardware data processor performs operations to:
        implement a voice-communication session for communicating voice data between the mobile device and at least one end-point device;
        receive a session-end message, wherein the session-end message is for signaling an end of the voice-communication session according to an input from a user of the mobile device;
        determine, at the mobile device, a packet drop rate using a total number of reported absences in packets during the voice-communication session and a total number of communicated packets or a total session duration;
        generate, at the mobile device, a radio condition indicator that represents one or more conditions associated with the wireless link,
            wherein the radio condition indicator includes the determined packet drop rate;
        determine a mute report based on the session-end message, wherein the mute report represents a mute event detected by the mobile device during the voice-communication session, and
            wherein the mute report includes, for the mute event, the radio condition indicator and at least one of:
                a duration of the mute event,
                a direction of the mute event, a geographic location associated with of the mute event, or a time of the mute event, and wherein the mute report is determined according to a predetermined format that designates values and/or bit locations within the session-end message for the mute report.

7. The apparatus of claim 6, further comprising a network analyzer coupled to the at least one hardware data processor, the network analyzer configured to:

crowd-sourcing a set of mute reports representative of mute events across a set of corresponding voice-communication sessions, wherein the set of mute reports includes the determined mute report; and identifying an estimated cause associated with the determined mute report based on analyzing the set of mute reports, wherein the estimated cause represents the geographic location, the access device, a manufacturer, or a device type corresponding to the mobile device, a network condition, or a combination thereof associated with the set of mute reports.

8. The apparatus of claim 6, wherein the mute report represents the mute event occurring at a beginning portion of the voice-communication session and/or occurring intermittently during the voice-communication session.

9. The apparatus of claim 6, wherein the mute report is determined based on parsing a text header to identify one or more text strings that represent a mute event status, the duration, the direction, a radio condition indicator, a corresponding delimiter, or a combination thereof.

10. The apparatus of claim 6, wherein the mute report is determined according to a predetermined format that designates values and/or bit locations within the session-end message for the mute report.

11. The apparatus of claim 6, wherein the IMS network is further configured to determine a radio condition indicator representative of one or more conditions associated with a wireless link between the wireless device and the access device during the voice-communication session, wherein the mute report includes the radio condition indicator for the mute event.

12. The apparatus of claim 6 wherein the mute report is separate from a Call Detail Record (CDR) and a link quality data configured to describe the wireless link to the access device.

13. A method comprising:

implementing a voice-communication session for communicating voice data between a mobile device and at least one end-point device;

receiving a session-end message, including a mute report, wherein the session-end message is for signaling an end of the voice-communication session according to an input from a user of the mobile device;

determining, at the mobile device, a packet drop rate using a total number of reported absences in packets during the voice-communication session and a total number of communicated packets or a total session duration;

generating, at the mobile device, a radio condition indicator that represents one or more conditions associated with a wireless radio link during the voice-communication session, wherein the radio condition indicator includes the determined packet drop rate;

determining the mute report based on the session-end message, wherein the mute report represents a mute event detected by the mobile device during the voice-communication session, and wherein the mute report includes, for the mute event, the radio condition indicator and at least two of:

a duration of the mute event, a direction of the mute event, a geographic location associated with of the mute event, or a time of the mute event, and wherein the mute report is determined according to a predetermined format that designates values and/or bit locations within the session-end message for the mute report.

14. The method of claim 13, further comprising:

crowd-sourcing a set of mute reports representative of mute events across a set of corresponding voice-communication sessions, wherein the set of mute reports includes the determined mute report; and identifying an estimated cause associated with the determined mute report based on analyzing the set of mute reports, wherein the estimated cause represents a geographic location, an access device, a manufacturer, or a device type corresponding to the mobile device, a network condition, or a combination thereof associated with the set of mute reports.

15. The method of claim 13, wherein the mute report represents the mute event occurring at a beginning portion of the voice-communication session and/or occurring intermittently during the voice-communication session.

16. The method of claim 13, wherein the mute report is determined based on parsing a text header to identify one or more text strings that represent a mute event status, a duration, a direction, a radio condition indicator, a corresponding delimiter, or a combination thereof.

17. The method of claim 13, wherein the mute report is separate from a Call Detail Record (CDR) and a link quality data configured to describe the wireless radio link to an access device.

* * * * *